United States Patent
Przytula et al.

(10) Patent No.: US 7,158,958 B2
(45) Date of Patent: Jan. 2, 2007

(54) AUTOMATIC GENERATION OF BAYSIAN DIAGNOSTICS FROM FAULT TREES

(75) Inventors: Krzysztof W. Przytula, Malibu, CA (US); Richard I. Milford, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 494 days.

(21) Appl. No.: 10/746,840

(22) Filed: Dec. 24, 2003

(65) Prior Publication Data
US 2005/0160324 A1     Jul. 21, 2005

(51) Int. Cl.
*G06N 5/00* (2006.01)
(52) U.S. Cl. .............................. 706/45; 714/37; 714/43
(58) Field of Classification Search ................. 706/45, 706/59, 47; 718/102; 714/37, 43
See application file for complete search history.

(56) References Cited

U.S. PATENT DOCUMENTS

| | | | | |
|---|---|---|---|---|
| 5,784,616 A | * | 7/1998 | Horvitz | 718/102 |
| 5,802,256 A | * | 9/1998 | Heckerman et al. | 706/59 |
| 5,995,997 A | * | 11/1999 | Horvitz | 718/102 |
| 6,574,537 B1 | | 6/2003 | Kipersztok et al. | |
| 6,611,825 B1 | | 8/2003 | Billheimer et al. | |
| 6,634,000 B1 | * | 10/2003 | Jammu et al. | 714/37 |
| 6,751,536 B1 | | 6/2004 | Kipersztok et al. | |
| 6,868,319 B1 | | 3/2005 | Kipersztok et al. | |
| 2005/0028033 A1 | | 2/2005 | Kipersztok et al. | |

OTHER PUBLICATIONS

Przytula, K. Wojtek et al., Construction of Bayesian Networks for Diagnostics, Aerospace Conference Proceedings, IEEE, vol. 5, Mar. 25, 2000, pp. 193-200.*

Andrea Bobbio, Luigi Portinale, Mchele Minichino, Ester Ciancamerla, "Comparing Fault Trees and Bayesian Networks for Dependability Analysis," 18th International Conference on Computer Safety, Reliability, and security, Tolouse, France, 1999.

Andreas Othonos, Kyriacos Kalli, Fiber Bragg Gratings: Fundamentals and Applications inTelecommunications and Sensing, Chapter 4: Inscribing Bragg Gratings in Optical Fibers, p. 149-187, May 1999, Artech House.

* cited by examiner

*Primary Examiner*—Wilbert L. Starks, Jr.
(74) *Attorney, Agent, or Firm*—Wildman, Harrold, Allen & Dixon LLP; Gary R. Gillen; Thomas J. Ring

(57) ABSTRACT

Fault trees are automatically converted to Bayesian networks for assisting in system reliability, failure analysis and diagnostics by using information from the fault tree structure to create the Bayesian network structure, creating parameters of the Bayesian network using information from the fault tree, obtaining information about observation nodes for the Bayesian network from a list of observations that augments information contained in the fault tree, and inserting the observation nodes into the Bayesian network. The fault tree is pre-processed into an intermediate format prior to conversion that may include adding reliability values from a separate text document when the fault tree is in such format that requires it.

14 Claims, 8 Drawing Sheets

| State for Node Sub-system Failure | State for Node Failure 1 | | | | State for Node Failure 2 | | | |
|---|---|---|---|---|---|---|---|---|
| | Yes | | Yes | | Yes | | OK | |
| | | | | | Yes | OK | Yes | OK |
| Yes | 1 | 0 | 1 | 0 | 1 | 1 | 0 | 0 |
| OK | 0 | 0 | 0 | 0 | 0 | 0 | 0 | 1 |

AUTOMATIC GENERATION OF BAYSIAN DIAGNOSTICS FROM FAULT TREES

BACKGROUND OF THE INVENTION

The present invention relates generally to diagnostic support tools and more particularly exploiting existing products such as fault trees for diagnostic support.

Fault trees are graphical representations of system failures. They show how failures of components contribute to system failures. The trees consists of nodes representing component failures and nodes representing functional failures of systems. They are connected by means of logic gates. Fault trees are used for quantitative reliability and fault analysis of high value or high risk systems. Bayesian networks (or belief networks) are a much more general representation of the system. They can be used not only to compute reliability and perform fault analysis, but also to assist in system diagnosis.

By exploiting existing products, specifically fault trees containing embedded or separate reliability data and observation databases, advanced high fidelity diagnostic tools based on Bayesian networks can be developed quickly and at low cost, without requiring an independent development effort. Currently such diagnostic products are typically not delivered on many systems (e.g., satellite programs) because of the prohibitive cost. However, the invention disclosed herein is not limited in application to satellite systems.

There is thus a need in the art for a system that converts the fault trees automatically into a probabilistic graphical representation called a Bayesian network or a belief network and enables a more inexpensive delivery of system diagnostics tools, allowing early and accurate detection of failures and a more rapid return to normal operation.

SUMMARY OF THE INVENTION

The present invention advantageously addresses the needs above as well as other needs by providing a system that converts the fault trees automatically into a probabilistic graphical representation called a Bayesian network or a belief network and enables the delivery of diagnostics tools on programs that would not otherwise receive them, allowing early detection of failures and a more rapid return to service.

In one embodiment, the invention can be characterized as a method of conversion of fault trees to Bayesian networks for assisting in system reliability, failure analysis and diagnostics comprising the steps of creating a structure of a Bayesian network using information from a fault tree, creating parameters of the Bayesian network using information from the fault tree, obtaining information about observation nodes for the Bayesian network from a list of observations that augments information contained in the fault tree, and inserting the observation nodes into the Bayesian network.

In another embodiment, the invention can be characterized as a system for performing diagnostic procedures comprising means for creating a structure of a Bayesian network using information from a fault tree and means for creating parameters of the Bayesian network using information from the fault tree operable for working in conjunction with the means for creating a structure of a Bayesian network. Means for obtaining information about observation nodes for the Bayesian network from a list of observations that augments information contained in the fault tree are operable for working in conjunction with the means for creating a structure of a Bayesian network. Also, means for inserting the observation nodes into the Bayesian network are operable for working in conjunction with the means for creating a structure of a Bayesian network.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
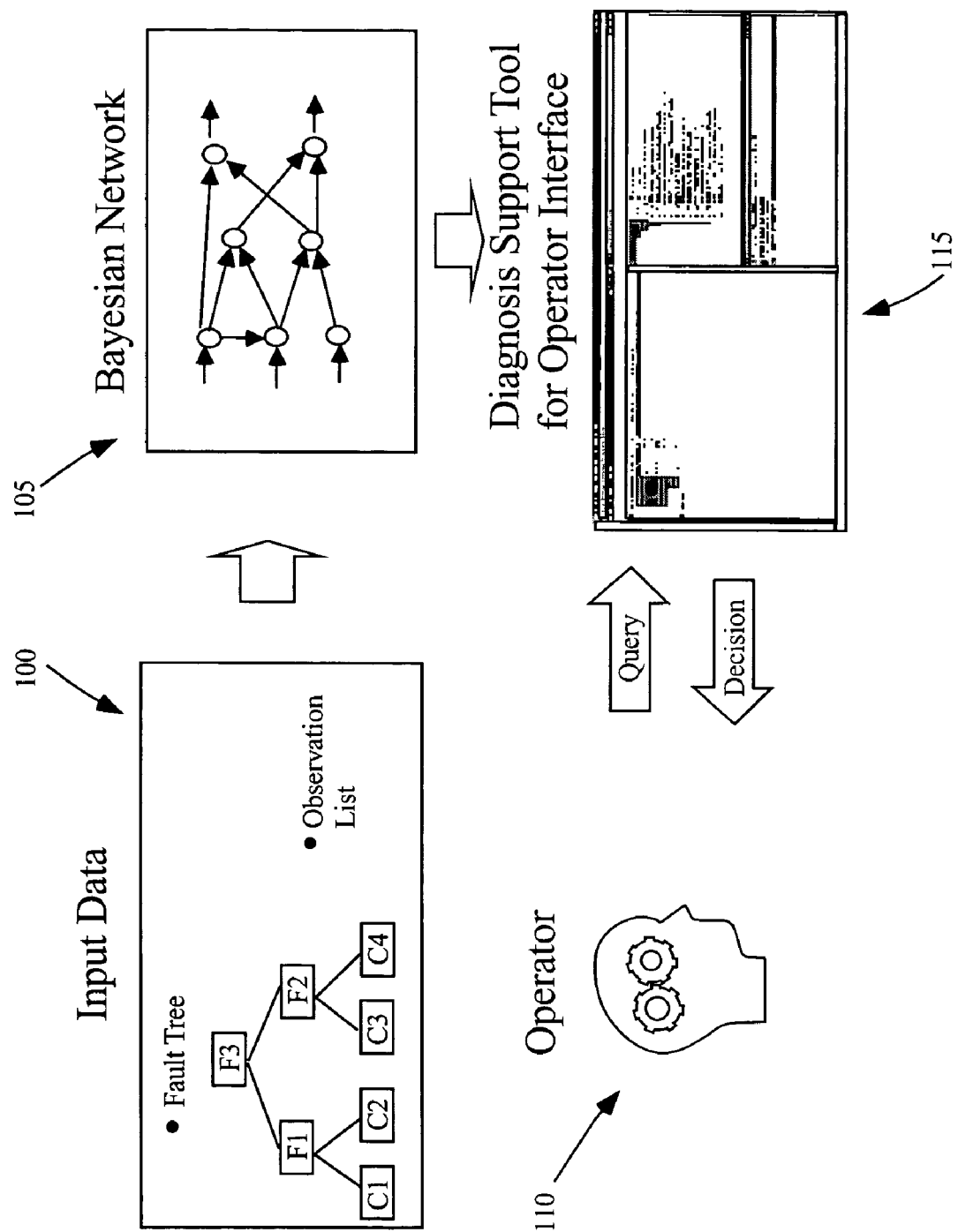
FIG. 1 is a diagram showing a high level view of the present invention according to an embodiment of the invention as a process for the design of a diagnostic support system.

Referring to FIG. 1, shown is a diagram showing a high level view of the present invention according to an embodiment of the invention as a process for the design of a diagnostic support system.

Shown is a graphical representation of a fault tree 100 (along with associated observation list), a graphical representation of a diagnostic Bayesian network 105, a graphical representation of a satellite system operator 110, and a graphical representation of a diagnostic support software tool and its graphical user interface 115.

The diagnostic Bayesian network (BN) 105 is used as a basis for a diagnostic decision support tool 115 (e.g., diagnosis of a spacecraft). The tool 115 comprises a front-end graphical user interface (GUI), library of probabilistic calculation routines (not shown), and the BN 105. The GUI of the tool 115 is used for entry of user commands i.e. diagnostic queries by an operator 110 and for output of diagnostic recommendations from the tool 115. The BN 105 is updated using the states of known observations 100. The states of observations are obtained automatically from the data source such as spacecraft telemetry reported from fault tests. The BN 105 for diagnostics is created through conversion of a fault tree (FT) 100 (associated with the spacecraft system, for example) to the BN 105.

Figure 2:
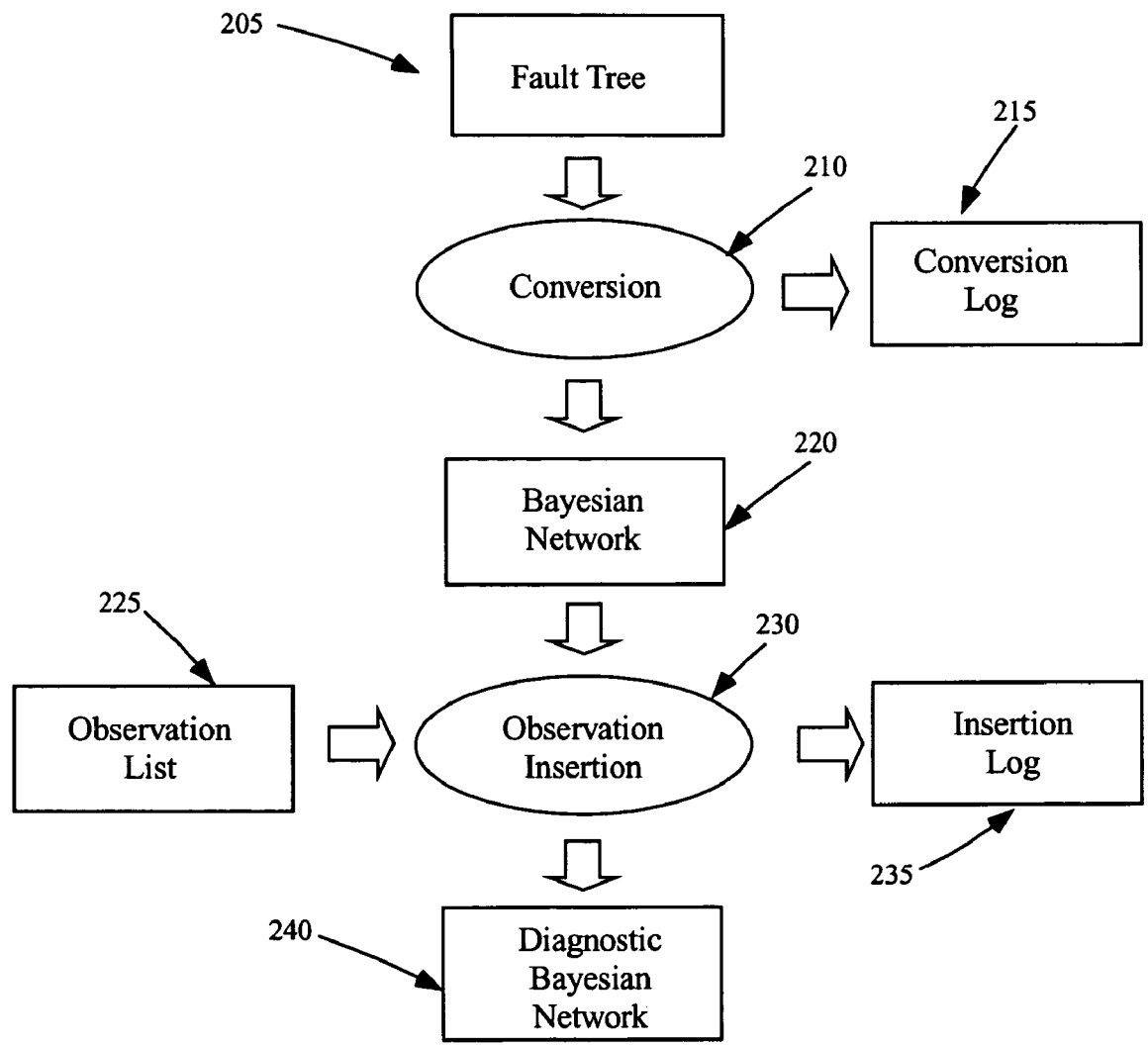
FIG. 2. is a diagram focusing on the fault tree to Bayesian Network conversion and observation insertion steps of building the diagnostic support system of FIG. 1 according to the present invention.

Referring next to FIG. 2, shown is a diagram focusing on the fault tree to Bayesian Network conversion and observation insertion steps of building the diagnostic support system of FIG. 1 according to the present invention.

Shown are blocks representing a fault tree (FT) 205, conversion log 215, an associated Bayesian network (BN) 220, observation list 225, insertion log 235 and a resulting diagnostic Bayesian Network 240. Also shown are the steps of conversion 210 of the fault tree 205 into the Bayesian Network 220 and observation insertion 230 into the Bayesian network 220.

First, the FT 205 is converted 210 to create the structure and parameters of the BN 220 and the record of the conversion is captured in the conversion log 215. Then in the second step, observation nodes are inserted 230 into the BN 220 previously created and an insertion log is created 235. Information about the observation nodes is obtained from the observation list 225, which augments the information contained in the FT. This results in the diagnostic BN 240.

Figure 3:
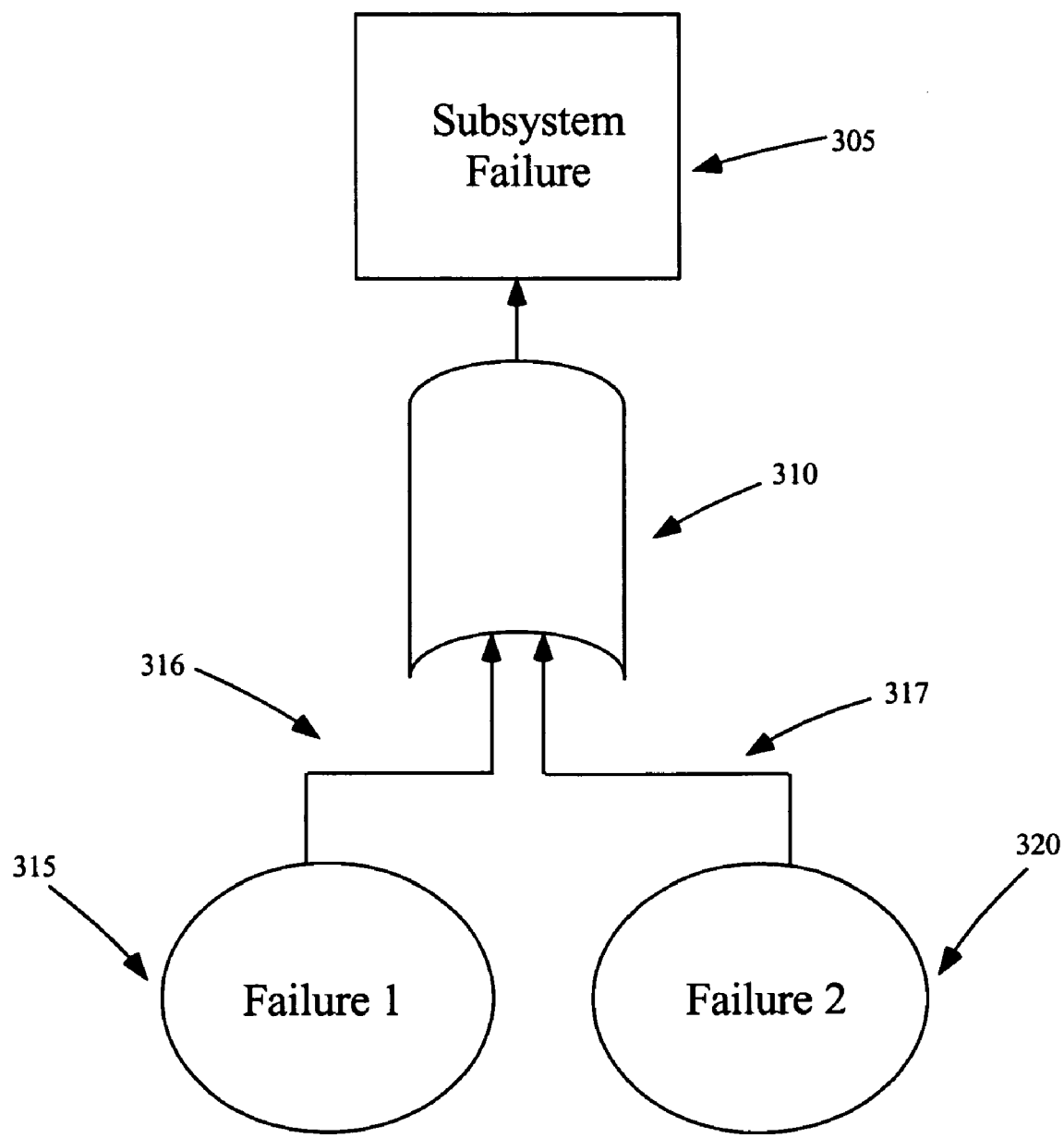
FIG. 3 is a diagram of a simple example of a fault tree that is to be converted to a Bayesian network according to an embodiment of the present invention.
Figure 4:
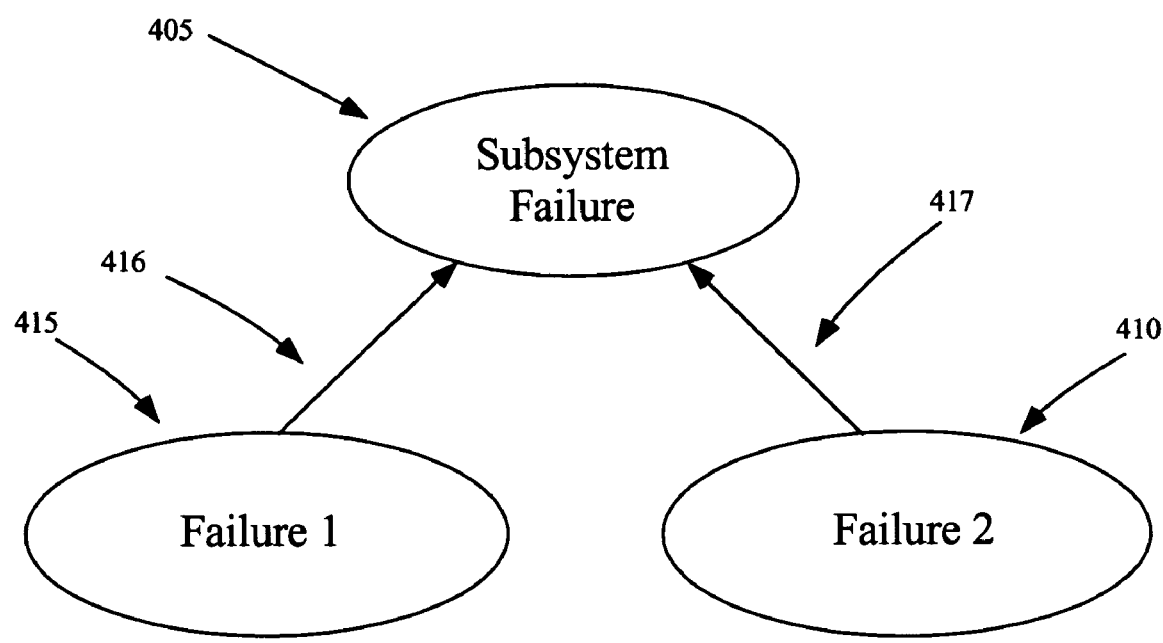
FIG. 4 is a diagram of what the fault tree of FIG. 3 looks like after the first step of converting it to a Bayesian Network according to an embodiment of the present invention.

Referring next to FIGS. 3 and 4, shown in FIG. 3 is a diagram of a simple example of a fault tree that is to be converted to a Bayesian network according to an embodiment of the present invention and in FIG. 4, shown is a diagram of what the fault tree of FIG. 3 looks like after the first step of converting it to a Bayesian Network according to an embodiment of the present invention.

Shown in FIG. 3 is a block representing a subsystem failure 305, a logic operation 310, directed links 316, 317 and nodes representing a failure 1 315 and a failure 2 320. Shown in FIG. 4 are BN representing a subsystem failure 405, failure 1 415 and failure 2 410 (two failures that would each cause the subsystem to fail), and links 416, 417.

In the present embodiment, the following formal assumptions are made regarding fault trees. As shown in FIG. 3, a fault tree (FT) has nodes 305, 315, 320 and directed links 316, 317. There are two types of nodes in the FT, event nodes 315, 320 and gate nodes 305. The event nodes 315, 320 are the leaf nodes of the tree. They represent component failures. They are statistically independent. Thus, each event node 315, 320 occurs in the tree only once. Two different event nodes cannot represent exclusive failure modes of the same component (e.g. valve failed-open, valve failed-closed). The remaining nodes are the gate nodes 305. They represent subsystem and system failures. They integrate events or other gates using logic operations 310 (e.g. AND, OR). The FT nodes 305, 315, 320 are interconnected by links 316, 317 so that they form a directed tree. Thus, for every two nodes there is a unique path connecting them. There are no loops allowed in the FT.

The following describes an algorithm for obtaining a BN structure from the FT according to an embodiment of the present invention. As shown in FIG. 4, the BN structure consists of nodes 405, 410, 415 and links 416, 417, which connect the nodes 405, 410, 415 with each other. For each node in the FT, create a node in the BN. As a name of the node in BN use the name provided in the FT. As a label of the node in BN use a unique identifier available in the FT. If there are no unique identifiers available in the FT, then create them. Assign to each BN node, two states e.g. yes and ok. The former is the failure state, whereas the latter represents an "ok" condition. Connect the nodes in the BN with links as they are connected in the FT. The direction of the connections in BN should be equivalent to the direction up the fault tree i.e. from leaves—events 315, 320 to gates 310 and then to the gates above them in the tree, up to the root gate. Thus, the event nodes, which are leaf nodes 315, 320 of the FT, will become root nodes 410, 415 of the BN.

Figure 5:
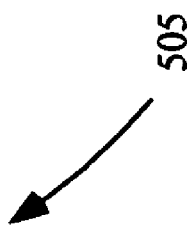
FIG. 5 is a diagram of a graphical user interface of a Bayesian network editor containing a conditional probabilities table associated with the sub-system failure node of the Bayesian Network of FIG. 4 according to an embodiment of the present invention.

Referring next to FIG. 5, shown is a screenshot of a graphical user interface containing a conditional probabilities table 505 associated with the Bayesian Network of FIG. 4 according to an embodiment of the present invention.

Figure 7:
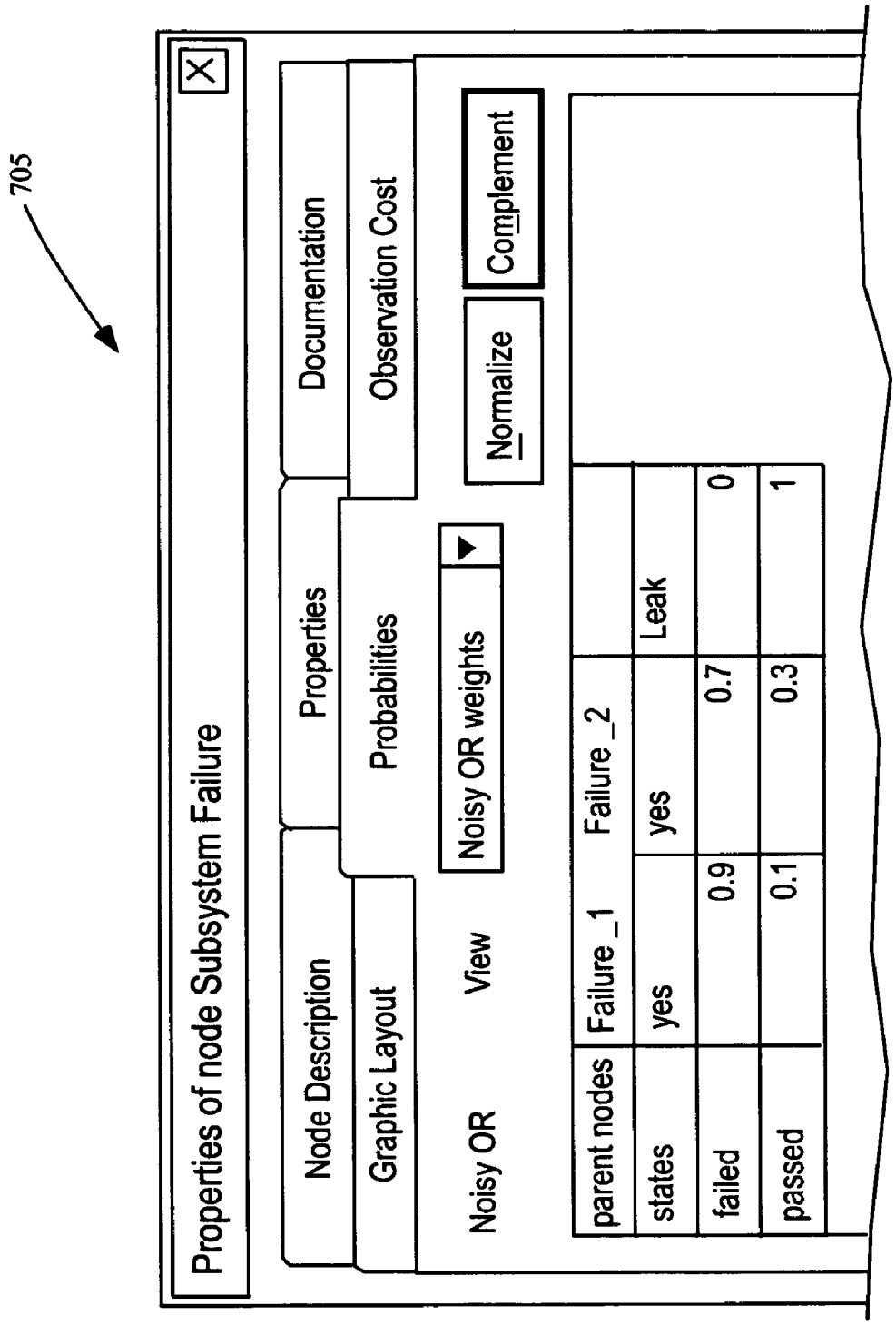
FIG. 7 is a screenshot of a graphical user interface of a Bayesian network editor containing a conditional probability table associated with the observation node of FIG. 6 according to an embodiment of the present invention.

All the nodes of BN that are not root nodes require conditional probability tables 505 such as that in FIG. 5. The conditional probability table is obtained from the type of the logic operation 310 performed by the gate 305 (e.g. AND or OR). The table 505 will consist of zeros and ones only and it will implement the logic operation 310 of the gate 305. One can use for simplicity Noisy Or probability table for gates of type OR with more than two parents (as shown in FIG. 7).

The parameters of the BN are probabilities. They must be defined for each of the nodes. The root nodes of the BN 410, 415, which are the event nodes 315, 320 of the FT, require only prior probability of the failure, which is assigned to the "yes" state. The prior probability of the "ok" state is computed as its complement. If the prior probability is not available, component failure rate $\lambda$ with a fixed time horizon may be used instead. Failure rate can also be computed from other reliability parameters, e.g. $\lambda=1/MTTF$, where MTTF stands for mean time to failure.

Some of the formal FT assumptions can be violated and the conversion algorithm will still be able to convert the FT to a BN with correct semantics. If a node is repeated in the FT, it will be converted to a single BN node. If two nodes represent exclusive failure modes of a single component and are connected to a single exclusive OR (XOR) gate, then they will be converted to a single BN node with separate states representing each of the failure modes.

Figure 6:
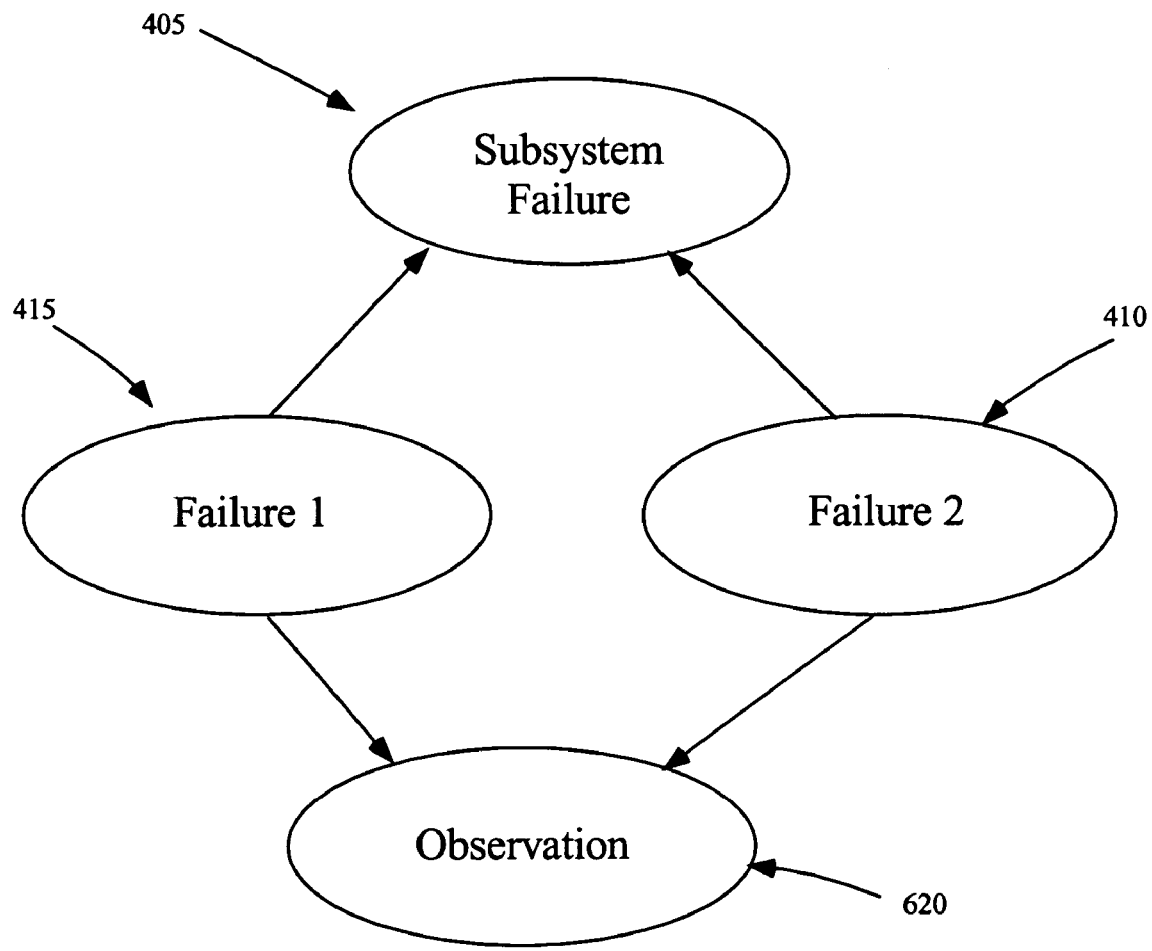
FIG. 6 is the Bayesian Network of FIG. 4 after insertion of an observation node to identify defective components (the next step in creating the Bayesian network).

Referring next to FIG. 6, shown is the Bayesian Network of FIG. 4 after insertion of an observation node to identify defective components.

Shown are nodes representing a subsystem failure 405, failure 1 415, failure 2 410 and observation node 620.

The BN of FIG. 4 created from the FT of FIG. 3 consists only of the nodes representing components and sub systems of the system described by the FT. This network is appropriate for reliability and failure analysis. It also provides predictive diagnostic information (e.g. if the subsystem X failed what is the most likely component failure that could cause it). In conventional diagnosis, it is desirable to identify the defective component using results of the performed observations (e.g. built-in tests (BIT)) or other relevant telemetry points. To apply the BN to this type of diagnosis, it is necessary to add the network nodes 620 representing the observations. The new BN of FIG. 6 is obtained from the BN of FIG. 4 and from a list of observations. The content of the list of observations and the algorithm used for insertion of the observations into the BN are described below.

The following information is to be provided in the list of observations. The names of the observations and the names of their results (e.g., fail, pass) are to be provided. For each of the observations, the names of the components and/or of the sub systems must be provided. These are observed by the observation, (i.e. names of nodes representing the components and/or functions in the FT).

For each of the observations and for each of the components or sub-systems, which are observed by the observation, the probability of producing the observation's results as a result of a failure of the component or the sub system is provided. For each of the observations from the list a new observation node 620 in the BN is created. The node will be of type Noisy Or and will have a name which is identical to the observation name. It will have a separate state for each of the possible observation results. For each observation node in the BN, links are provided connecting it with all the component and sub system nodes 405, 410, 415 in the BN, which are observed by the observation, as indicated in the list. The links are directed from the components' nodes 410, 415 and sub-systems' nodes 405 to the observation nodes 620.

Referring next to FIG. 7, shown is a screenshot of a graphical user interface of a Bayesian network editor containing a conditional probability table 705 associated with the observation node 620 of FIG. 6 according to an embodiment of the present invention.

For each of the observation nodes in the BN a Noisy OR conditional probability table 705 is created using the probability of producing the observation results, which is provided in the list 225. The Noisy OR conditional probability table 705 contains one column for each observed component and/or subsystem. In each column at the row for "failed" state of the observation one enters the probablility of the failure of the observation given failure of the component or subsystem contained in the observation list 225. In addition to the columns for each observed compenent or subsystem, there is a Leak column. This column contains the probability of a failure state of the observation if all components or subsystems observed by it are OK. One can assume for simplicity that the Leak is equal to zero as shown in table 705.

Figure 8:
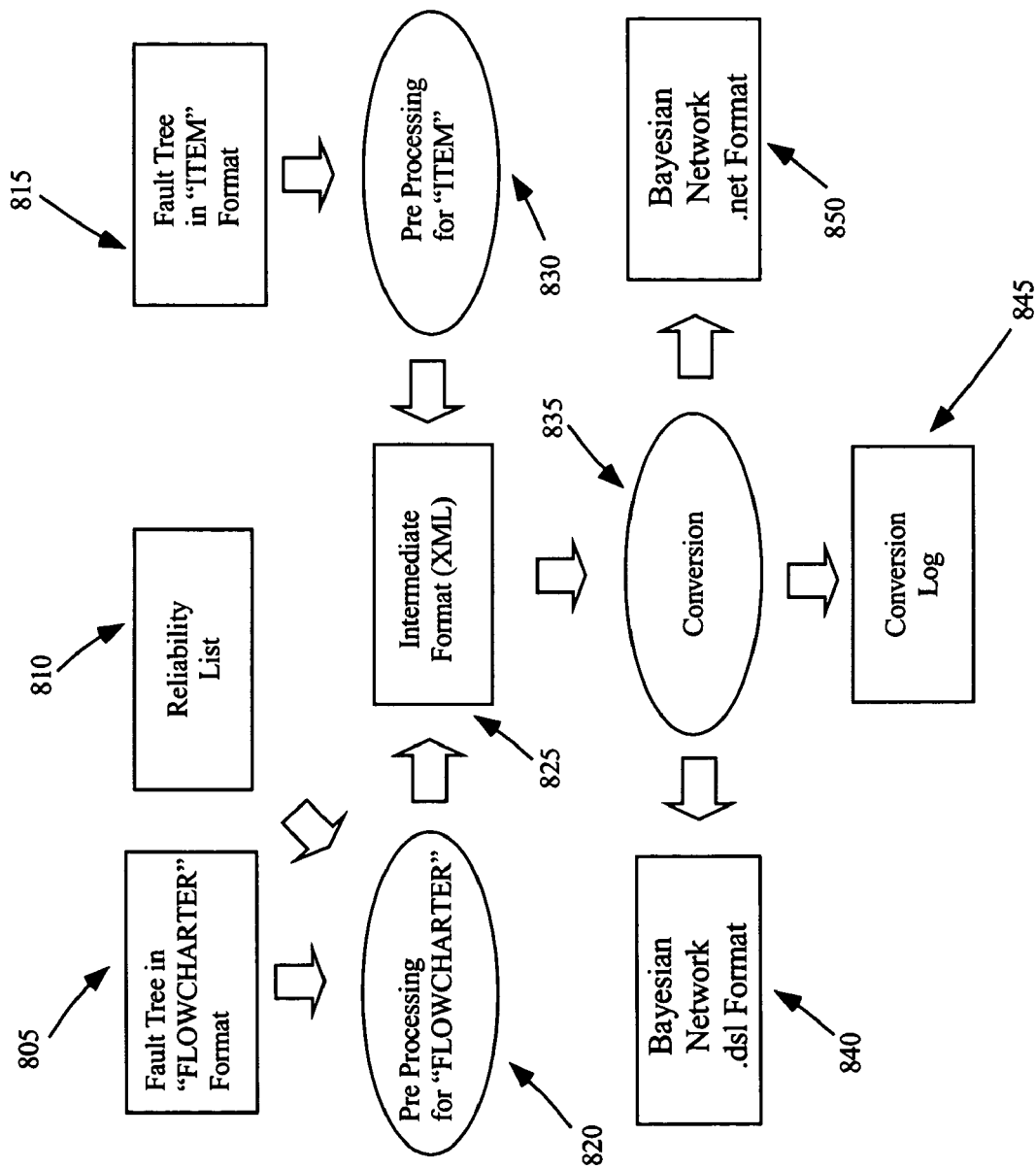
FIG. 8 is a diagram of the fault tree to Bayesian network conversion step of FIG. 2 as implemented in software assuming two different examples of fault tree representations obtained using commercial fault tree editors according to the present invention.

Referring next to FIG. 8, shown is a diagram of the fault tree to Bayesian network conversion step of FIG. 2 as implemented in software assuming two different examples of practical fault tree representations obtained using typical commercial fault tree editors according to the present invention. It is important to note that the present invention is not limited in scope to accepting only the fault tree formats created by the particular software programs for fault tree editing used in the present embodiment.

Shown in FIG. 8 are blocks representing a fault tree in MICROGRAFX FLOWCHARTER format 805 (a general purpose commercial off-the-shelf graphing tool software), a reliability list 810, the fault tree intermediate format in Extensible Markup Language (XML) 825, a fault tree in ITEM SOFTWARE, Inc. format 815 (typical commercial off-the-shelf fault tree software), a Bayesian network in two examples of off-the-shelf Bayesian network editor formats, namely in .dsl (GENIE editor) format 840 and net (HUGIN editor) format 850, and a conversion log 845. Also shown are the steps of pre-processing for FLOWCHARTER 820, pre-processing for ITEM SOFTWARE 830 and conversion into Bayesian network 835.

The specific software implementation of the FT to BN conversion is at present designed to accept a FT created in the two different formats. The first format 505 is obtained from a program called FLOWCHARTER by MICRO-GRAFX. This is a general purpose-graphing tool.

The FLOWCHARTER FT contains only the structure of the tree and its node names. The reliability values 810 are taken in from a separate text document. The second format 815 is that of a specialized FT tool by ITEM SOFTWARE, Inc. The FT exported out of ITEM contains all the FT information necessary for conversion. The two formats undergo a separate preprocessing step 820, 830. As a result of the step a uniform intermediate representation in text format is obtained 825, called FTML, for Fault Tree Markup Language. FTML is variant of Extensible Markup Language (XML). The use of intermediate representation makes it easy to extend the software to other formats of fault trees by simply creating a new specialized preprocessor for each new format. The rest of the converter remains the same. The preprocessors 820, 830 perform extensive checking for correctness and completeness of the FTs (e.g., syntax checking). The most serious format problems in the FT result in aborting the program execution. Remaining problems can be corrected in the preprocessing step. Information about the problems is stored in the Conversion Log 845.

The actual conversion to a BN 835 is done from the FT in the Intermediate Format 825. The obtained BN is saved in two popular BN editing formats: .dsl (GENIE format) 840 and .net (HUGIN) format 850. Thus, two different BN editing tools can be used to open the BN, examine it, modify and possibly perform queries on them. The software may also be extended to other formats of Bayesian networks as well.

Referring again to FIG. 2, an entirely separate software component is used to insert observations into the BN. An example of such observations are spacecraft telemetry points. The BN with the observations inserted becomes a diagnostic BN 240. Here also, the input is checked for correctness and completeness and results of it are included in the log 235 for the insertion step. The input for the insertion program is assumed to be in .dsl format, but the output can again be in one of the two formats, i.e. .dsl (GeNIe format) or .net (Hugin format).

As a decision support tool for diagnosis of a spacecraft (as in FIG. 1), the diagnostic BN 240 can be used as a basis for a diagnostic recommendations. The diagnostic recommendations are obtained by means of probabilistic calculations performed on the updated BN. Probability $p(x_i)$ of a defect is computed for each component $x_i$ from a joint probability distribution $p(x_1, x_2, x_3, \ldots x_n)$ over all components and observations. The joint probability is computed using a chain rule:

$$p(x_1, x_2, x_3, \ldots, x_n) = \prod_{i=1}^{n} p(x_i \mid x_1, \ldots, x_{i-1})$$

In a typical BN obtained from a fault tree a set of variables Si on which the variable x depends conditionally is only a small subset of the variables listed on the right hand side of the general chain rule. Thus, the following holds:

$$p(x_i \mid x_i, \ldots, x_{i-1}) = p(x_i \mid S_i)$$

Therefore the joint probability for the BN can be obtained using a simpler computation:

$$p(x_1, x_2, x_3 \mid \ldots, x_n) = \prod_{i=1}^{n} p(x_i \mid s_i)$$

The formulas are part of the library of probabilistic routines used in the diagnostic decision support tool 115, The software has been tested on several large examples of real-life fault trees. They ranged from about 100 nodes to over 800 nodes. The speed of the conversion is very reasonable. For a fault tree of 859 nodes, the process requires less than a minute on a computer based on PENTIUM 4, 1.7 MHz INTEL processor. The results confirmed expectations of the conversion method and of the software.

While the invention herein disclosed has been described by means of specific embodiments and applications thereof, numerous modifications and variations could be made thereto by those skilled in the art without departing from the scope of the invention set forth in the claims.

What is claimed is:

1. A method of conversion of at least one of satellite and spacecraft fault trees to Bayesian networks for assisting in system reliability, failure analysis and diagnostics comprising the steps of:
   creating a structure of a Bayesian network using information from at least one of a satellite and a spacecraft fault tree;
   creating parameters of the Bayesian network using information from the fault tree;
   obtaining information about observation nodes for the Bayesian network from a list of observations that augments information contained in the fault tree; and
   inserting the observation nodes into the Bayesian network.

2. The method of claim 1 wherein the step of creating a structure of a Bayesian network comprises the steps of:
   creating a node in the Bayesian network for each node in the fault tree;
   naming each node in the Bayesian network the same as a corresponding node in the fault tree;
   labeling each node in the Bayesian network with a unique identifier from the tree if available, and creating the unique identifiers if they are not available in the fault tree;
   assigning to each Bayesian network node two states, one being a failure state and one being an OK state;
   connecting the nodes in the Bayesian network with links as corresponding nodes iii the fault tree are connected and wherein the direction of connections between the nodes is equivalent to the direction up the fault tree.

3. The method of claim 1 wherein the step of creating parameters of the Bayesian network comprises the steps of:
   defining prior probability of failure for each root node of the Bayesian network;
   building conditional probability tables based upon the type of logic operations performed in the fault tree; and
   defining conditional probabilities for each of the nodes in the Bayesian network that are not root nodes using corresponding conditional probability tables.

4. The method of claim 3, further comprising the step of pre-processing the fault tree into an intermediate format prior to conversion.

5. The method of claim 4 wherein pre-processing step comprises syntax checking of the fault tree.

6. The method of claim 4 wherein the pre-processing step comprises including reliability values from a separate text document when the fault tree is in such format that requires it.

7. The method of claim 1 further comprising the step of performing a system diagnostic procedure using the Bayesian network.

8. The method of claim 1 further comprising the step of taking repair actions based upon diagnostic recommendations resulting from the diagnostic procedure.

9. The method of claim 1 further comprising the step of performing system failure analysis using the Bayesian network.

10. The method of claim 1 further comprising the step of performing system reliability analysis using the Bayesian network.

11. The method of claim 1 wherein the information about observation nodes is based on spacecraft telemetry in information.

12. The method of claim 1 wherein the steps are performed automatically.

13. A system for performing diagnostic proceed urea comprising:
    means for creatine a structure of a Bayesian network using information from at least one of a spacecraft and a satellite fault tree;
    means for creating parameters of the Bayesian network using information from the fault tree operable for working in conjunction with the means for creating a structure of a Bayesian network;
    means for obtaining information about observation nodes for the Bayesian network from a list of observations that augments information contained in the fault tree operable for working in conjunction with the means for creating a structure of a Bayesian network; and
    means for inserting the observation nodes into the Bayesian network operable for working in conjunction with the means for creating a structure of a Bayesian network.

14. The system of claim 13 wherein the means for creating a structure of a Bayesian network comprises: means for creating a node in the Bayesian network for each node in the fault tree;
    means for naming each node in the Bayesian network the same as a corresponding node in the fault tree;
    means for labeling each node in the Bayesian network with a unique identifier from the fault tree if available, and creating the unique identifiers if they are not available in the fault tree;
    means for assigning to each Bayesian network node two states, one being a failure state and one being an OK state;
    means for connecting the nodes in the Bayesian network with links as corresponding nodes in the fault tree are connected and wherein the direction of connections between the nodes is equivalent to the direction up the fault tree wherein all said means are in operable communication with a means for controlling operation of the system.

* * * * *